US012265888B1

(12) United States Patent
Meyer et al.

(10) Patent No.: US 12,265,888 B1
(45) Date of Patent: Apr. 1, 2025

(54) EDGE COMPUTING FOR MACHINE LEARNING

(71) Applicant: UIPCO, LLC, San Antonio, TX (US)

(72) Inventors: Gregory Brian Meyer, San Antonio, TX (US); Mark Anthony Lopez, Helotes, TX (US); Ravi Durairaj, San Antonio, TX (US); Nolan Serrao, Plano, TX (US); Victor Kwak, Frisco, TX (US); Ryan Thomas Russell, San Antonio, TX (US); Christopher Russell, The Colony, TX (US); Ruthie D. Lyle, Durham, NC (US)

(73) Assignee: United Services Automobile Association (USAA), San Antonio, TX (US)

( * ) Notice: Subject to any disclaimer, the term of this patent is extended or adjusted under 35 U.S.C. 154(b) by 272 days.

(21) Appl. No.: 16/885,327

(22) Filed: May 28, 2020

Related U.S. Application Data

(60) Provisional application No. 62/855,095, filed on May 31, 2019.

(51) Int. Cl.
*G06N 20/00* (2019.01)
(52) U.S. Cl.
CPC .................... *G06N 20/00* (2019.01)
(58) Field of Classification Search
CPC ..................................................... G06N 20/00
(Continued)

(56) References Cited

U.S. PATENT DOCUMENTS

| | | | |
|---|---|---|---|
| 2014/0188768 A1* | 7/2014 | Bonissone | G06N 20/00 706/12 |
| 2016/0063393 A1* | 3/2016 | Ramage | H04L 67/01 706/12 |

(Continued)

FOREIGN PATENT DOCUMENTS

| | | | | |
|---|---|---|---|---|
| JP | 2004297192 A | * | 10/2004 | |
| JP | 2005025362 A | * | 1/2005 | G06F 16/275 |

(Continued)

OTHER PUBLICATIONS

Hussain et al., "Federated Learning: a Survey of a New Approach to Machine Learning," 2022 First International Conference on Electrical, Electronics, Information and Communication Technologies (ICEEICT), 2022, pp. 1-8, doi: 10.1109/ICEEICT53079.2022.9768446. (Year: 2022).*

(Continued)

*Primary Examiner* — Peter C Shaw
(74) *Attorney, Agent, or Firm* — Plumsea Law Group, LLC

(57) ABSTRACT

A system and method for performing machine learning in a mobile computing device which is configured to be coupled with a cloud computing system is disclosed. The method may include activating, on the mobile computing device, a machine learning application, which accesses a local machine learning system including a local machine learning model, periodically updating the local machine learning system based upon updates for the local machine learning system received from a global machine learning system hosted by the cloud computing system, performing machine learning based on received training data, and periodically transmitting changes to the local machine learning system from the mobile computing device to the global machine learning system hosted by the cloud computing system.

20 Claims, 15 Drawing Sheets

(58) Field of Classification Search
USPC .......................................................... 706/12
See application file for complete search history.

(56) References Cited

U.S. PATENT DOCUMENTS

| | | | | |
|---|---|---|---|---|
| 2018/0375720 | A1* | 12/2018 | Yang | G06N 20/00 |
| 2019/0311259 | A1* | 10/2019 | Cricri | H04L 65/612 |
| 2019/0385043 | A1* | 12/2019 | Choudhary | G06F 13/4213 |
| 2019/0385090 | A1* | 12/2019 | Katole | G06N 5/04 |
| 2020/0161005 | A1* | 5/2020 | Lyman | G06F 9/542 |
| 2020/0304381 | A1* | 9/2020 | Wang | H04L 47/365 |
| 2021/0073639 | A1* | 3/2021 | Jakkam Reddi | G06N 3/084 |
| 2021/0166157 | A1* | 6/2021 | Bhowmick | G06N 20/20 |

FOREIGN PATENT DOCUMENTS

| | | | | |
|---|---|---|---|---|
| JP | 2008269215 | A * | 11/2008 | |
| JP | 5587228 | B2 * | 9/2014 | G06F 16/9535 |
| WO | WO-2017003547 | A1 * | 1/2017 | G06F 19/00 |
| WO | WO-2018057302 | A1 * | 3/2018 | G06F 17/12 |
| WO | WO-2019042571 | A1 * | 3/2019 | G06N 20/00 |
| WO | WO-2020192896 | A1 * | 10/2020 | G06N 20/20 |
| WO | WO-2021107831 | A1 * | 6/2021 | G01S 5/0036 |
| WO | WO-2021185197 | A1 * | 9/2021 | G06F 18/214 |
| WO | WO-2022148283 | A1 * | 7/2022 | G06F 21/602 |
| WO | WO-2022153324 | A1 * | 7/2022 | |
| WO | WO-2022180227 | A1 * | 9/2022 | |
| WO | WO-2022246378 | A1 * | 11/2022 | G06F 16/2445 |

OTHER PUBLICATIONS

Asad et al.. "Federated Learning Versus Classical Machine Learning: a Convergence Comparison," ArXiv abs/2107.10976 (2021): pp. 1-9. (Year: 2021).*

"IEEE Guide for Architectural Framework and Application of Federated Machine Learning," in IEEE Std 3652. Jan. 2020, vol. No., pp. 1-69, Mar. 19, 2021, doi: 10.1109/IEEESTD.2021. 9382202. (Year: 2021).*

Qin et al., "MLMG: Multi-Local and Multi-Global Model Aggregation for Federated Learning," 2021 IEEE International Conference on Pervasive Computing and Communications Workshops and other Affiliated Events (PerCom Workshops), 2021, pp. 565-571, doi: 10.1109/PerComWorkshops51409.2021.9431011. (Year: 2021).*

Hamdan et al., "Comparison study between conventional machine learning and distributed multi-task learning models," 2020 21st International Arab Conference on Information Technology (ACIT), 2020, pp. 1-5, doi: 10.1109/ACIT50332.2020.9300096. (Year: 2020).*

Wu et al., "Federated Block Coordinate Descent Scheme for Learning Global and Personalized Models," arXiv:2012.13900v2, Dec. 27, 2020. (Year: 2020).*

Shevlane, "Structured access: an emerging paradigm for safe AI deployment," arXiv:2201.05159v2, Apr. 11, 2022. (Year: 2022).*

Zhang et al., "Blockchain-based Federated Learning for Device Failure Detection in Industrial IoT," arXiv:2009.02643v2, Oct. 18, 2020. (Year: 2020).*

Qin et al., "MLMG: Multi-Local and Multi-Global Model Aggregation for Federated Learning," 2021 IEEE, Kassel, Germany, 2021, pp. 565-571, doi: 10.1109/PerComWorkshops51409.2021.9 (Year: 2021).*

Kulkarni et al., "Survey of Personalization Techniques for Federated Learning," 2020 Fourth World Conference on Smart Trends in Systems, Security and Sustainability (WorldS4), London, UK, 2020, pp. 794-797, doi: 10.1109/WorldS450073.2020.9210355. (Year: 2020).*

Khan et al., "Dispersed Federated Learning: Vision, Taxonomy, and Future Directions," in IEEE Wireless Communications, vol. 28, No. 5, pp. 192-198, Oct. 2021, doi: 10.1109/MWC.011.2100003. (Year: 2021).*

Yan et al., "A Hybrid Data and Model Transfer Framework for Distributed Machine Learning," 2019 11th International Conference on Wireless Communications and Signal Processing (WCSP), Xi'an, China, 2019, pp. 1-7, doi: 10.1109/WCSP.2019.8928046. (Year: 2019).*

Zhu et al., "Query based hybrid learning models for adaptively adjusting locality," The 2012 International Joint Conference on Neural Networks (IJCNN), Brisbane, QLD, Australia, 2012, pp. 1-8, doi: 10.1109/IJCNN.2012.6252422. (Year: 2012).*

Qin et al., "MLMG: Multi-Local and Multi-Global Model Aggregation for Federated Learning," 2021 IEEE (PerCom Workshops), Kassel, Germany, 2021, pp. 565-571, doi: 10.1109/PerComWorkshops51409.2021.9 (Year: 2021).*

Li et al., "An Efficient Federated Learning System for Network Intrusion Detection," in IEEE Systems Journal, vol. 17, No. 2, pp. 2455-2464, Jun. 2023, doi: 10.1109/JSYST.2023.3236995. (Year: 2023).*

Casas, "Machine learning models for wireless network monitoring and analysis," 2018 IEEE Wireless Communications and Networking Conference Workshops (WCNCW), Barcelona, Spain, 2018, pp. 242-247, doi: 10.1109/WCNCW.2018.8369024. (Year: 2018).*

Hu et al., "Distributed Machine Learning for Wireless Communication Networks: Techniques, Architectures, and Applications," in IEEE Communications Surveys & Tutorials, vol. 23, No. 3, pp. 1458-1493, thirdquarter 2021, doi: 10.1109/COMST.2021. 3086014. (Year: 2021).*

\* cited by examiner

EDGE COMPUTING FOR MACHINE LEARNING

CROSS-REFERENCE TO RELATED APPLICATIONS

This application claims the benefit of Provisional Patent Application No. 62/855,095 filed May 31, 2019, and titled "Edge Computing for Machine Learning," which is incorporated by reference herein in its entirety.

TECHNICAL FIELD

The present disclosure generally relates to methods and systems for providing machine learning to a user, and in particular for conducting machine learning using a mobile computing device which has access to additional machine learning in a cloud computing system.

BACKGROUND

Machine learning is a type of artificial intelligence which is used in cloud computing systems. Machine learning uses algorithms to analyze or learn from previously collected data and to make predictions regarding new input data. Data input to a machine learning system may be referred to as training data. Machine learning builds models from training data which may be input in a variety of ways into a machine learning system and can be used to find patterns in data. For example, training data may be gathered from data bases, input by a user into a computing system, or provided by a sensor which collects data. These models may have one or more labels and weights, which may be changed based on training data. Thus, these models continually learn from training data. These models can provide answers to questions, make determinations, or make recommendations or predictions.

Cloud computing systems are frequently used for machine learning because a very large amount of resources is needed to store and analyze training data. However, as the amount of training data collected and processed by the cloud computing system continues to increase, this causes a problem of increased load on the cloud computing system. In addition, machine learning on the cloud computing system also has a latency problem because training data must traverse a long route to arrive at the cloud computing system and the response output by machine learning to an end user device must also traverse a long route.

There is a need in the art for a system and method that addresses the shortcomings discussed above.

SUMMARY

In one aspect, a method for performing machine learning in a mobile computing device which is configured to be coupled with a cloud computing system, may include activating, on the mobile computing device, a machine learning application, which accesses a local machine learning system including a local machine learning model, which includes one or more training parameters, and which is stored in a memory of the mobile computing device; periodically updating the local machine learning system based upon updates for the local machine learning system received from a global machine learning system hosted by the cloud computing system; performing machine learning based on received training data; and periodically transmitting changes to the local machine learning system from the mobile computing device to the global machine learning system hosted by the cloud computing system.

In another aspect, a method for performing machine learning to assist a user including: providing a global machine learning system stored in a memory of a cloud computing system; activating, on the mobile computing device, a machine learning application, which accesses a local machine learning system including a local machine learning model, which includes one or more training parameters, and which is stored in a memory of the mobile computing device; periodically transmitting any changes to the local machine learning system from the global machine learning system stored in the cloud computing system to the mobile computing device; updating the local machine learning system based upon the transmitted changes from the global machine learning system; performing machine learning based on received training data; periodically transmitting changes to the local machine learning system from the mobile computing device to the cloud computing system; and updating the global machine learning system with the transmitted changes from the local machine learning system.

In another aspect, a cloud computing system to perform machine learning using a mobile computing device may include at least one memory including instructions and at least one hardware processor to execute the instructions within the at least one memory to implement storing a global machine learning system including a global machine learning model, which includes one or more training parameters, in a memory of the cloud computing system; periodically transmitting to the mobile computing device changes to a local machine learning system stored on the mobile computing device; periodically receiving changes to the local machine learning system from the local machine learning system of the mobile computing device; and performing machine learning based on both the transmitted changes to the local machine learning system of the mobile computing device and the received changes to the local machine learning system from the mobile computing device.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Edge computing relates to distributing processing resources and data storage closer to where the data is created to avoid the long routes to a computer system such as a cloud computing system. One or more embodiments of the present application provide a local machine learning system at a mobile computing device in order to reduce the traffic between a mobile computing device and a cloud computing system (decrease latency) and to take advantage of the processing resources of the mobile computing device to reduce the load of the cloud computing system.

Figure 1:
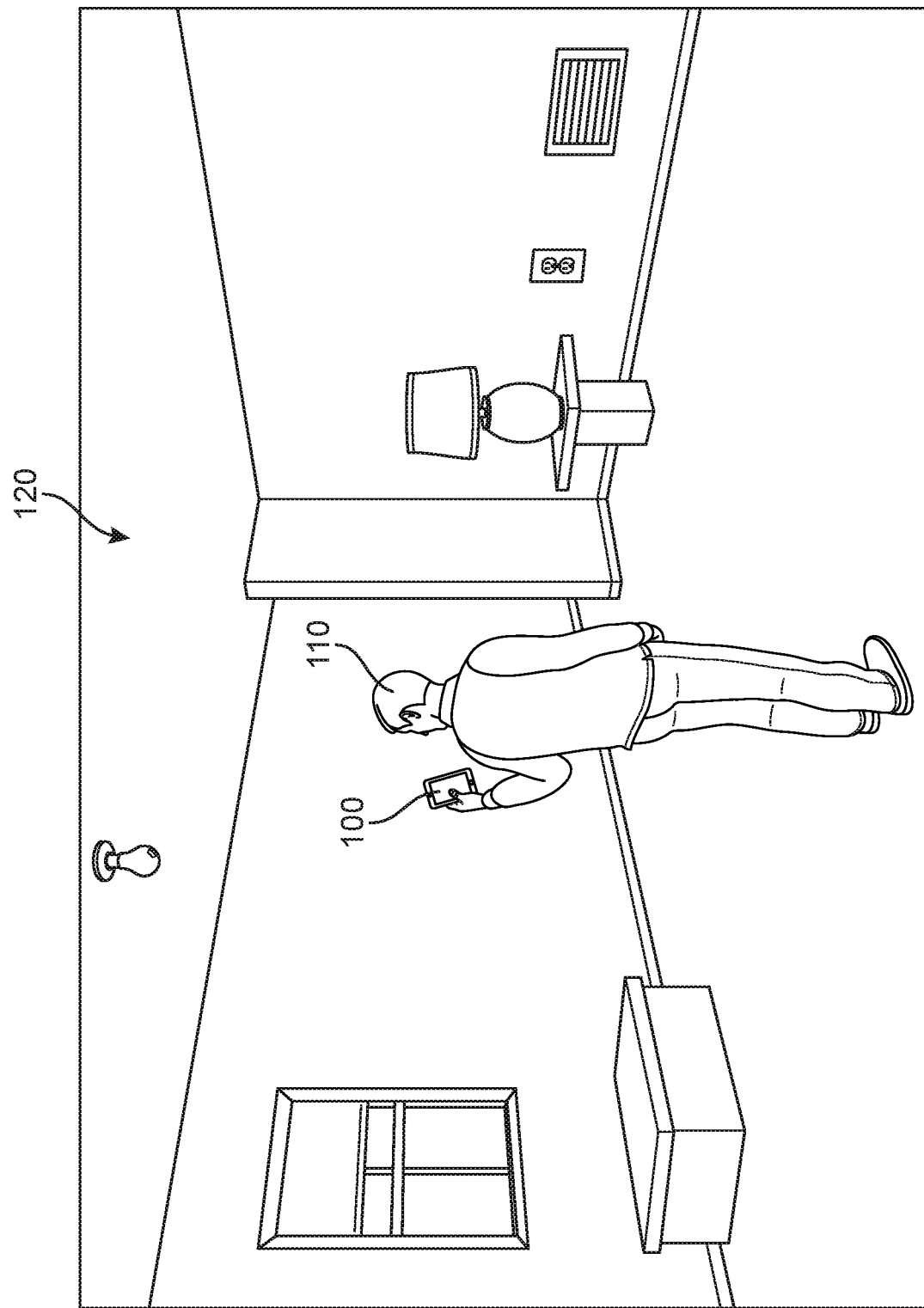
FIG. 1 is a view of a user accessing an application on a mobile computing device according to an embodiment.

FIG. 1 shows a user 110 holding a mobile computing device 100 in a room 120 of a home or office according to an embodiment. Although mobile computing device 100 is shown as a smartphone in FIG. 1, examples of mobile computing devices may include a smartphone, a tablet, a smartwatch, a smart glass, a smart helmet, and a laptop. Although embodiments refer to the use of mobile computing devices, any computing device could run software applications in embodiments of the present application.

Figure 2:
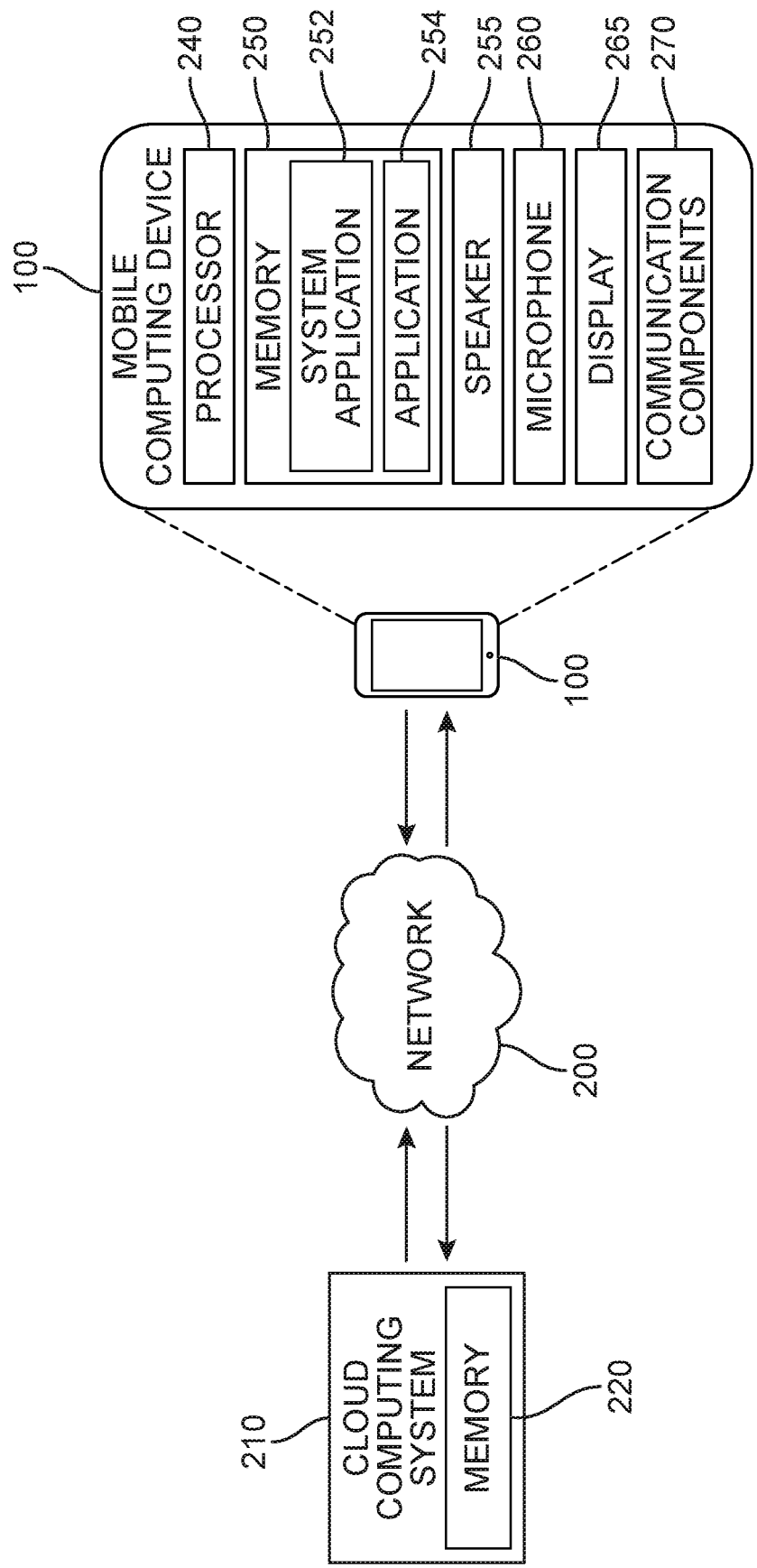
FIG. 2 is a schematic view of a network coupling a mobile computing device of FIG. 1 to a cloud computing system according to an embodiment.

FIG. 2 is a schematic view of a mobile communication device 100 of FIG. 1 coupled to a network 200 and a cloud computing system 210 coupled to the network 200 according to an embodiment. A cloud computing system 210 may have a memory 220 storing a global machine learning system, which includes at least one global machine learning model. More specifically, a global machine learning system includes software modules to facilitate the learning process, answer questions, make determinations, make and/or execute recommendations, and make and/or execute predictions. A global machine learning model includes parameters which may facilitate machine learning. These parameters may include training parameters, such as labels or weights, which may or may not change as training data is acquired. Training data may be input in a variety of ways into a global machine learning system and can be used to find patterns in data. For example, training data may be gathered from data bases, input by a user, or provided by a sensor which collects data. Based on this training data, a global machine learning system can update a global machine learning model by maintaining or changing training parameters such as weights or labels. An example of a global machine learning system may be directed toward all aspects of an automobile.

Alternatively, the global machine learning system may include a plurality of local machine learning systems, which may be stored in memory 220 of the cloud computing system 210. Each local machine learning system may include a local machine learning model, which includes parameters, which may facilitate training. These parameters may include training parameters, such as labels or weights, which may or may not change as training data is acquired. Training data may be input in a variety of ways into a global machine learning system and can be used to find patterns in data. For example, training data may be gathered from data bases, input by a user, or provided by a sensor which collects data. Based on this training data, a global machine learning system can update one or more local machine learning models of one or more local machine learning systems. One example of a local machine learning system may provide a local machine learning system for a body of an automobile and another local machine learning system may provide a local machine learning system for an engine of an automobile. However, these are only examples of potential local machine learning systems. In addition, a local machine learning system could have one or more local machine learning models.

The one or more local machine learning systems in memory 220 can be configured to be transmitted to a mobile computing device 100 through network 200. The global machine learning system may be used and managed by a financial institution. Further, although a financial institution may use and manage the cloud computing system, another organization specializing in providing cloud computing systems for customers such as financial institutions may manage the cloud computing system for the financial institution.

By providing a local machine learning system including a local machine learning model including training parameters in memory 250 of mobile computing device 100, the processing (computing) resources of the mobile computing device 100 may be used to receive training data to facilitate the learning process, answer questions, make determinations, make and/or execute recommendations, and make and/or execute predictions. By taking advantage of the processing resources of the mobile computing device 100, this reduces the traffic between a mobile computing device and a cloud computing system (decrease latency) and reduces the load of the cloud computing system 210. Moreover, after a local machine learning system is stored in memory 250 of the mobile computing device 100, only changes in the local machine learning model such as changes in one or more training parameters may be transmitted to the global machine learning system and/or may be received from the global machine learning system. By transmitting only the changes in the local machine learning model, this reduces traffic (decreases latency), increases speed, and reduces the load of the cloud computing system 210.

Examples of global machine learning models and local machine learning models may include regression algorithms, instance-based algorithms, regularization algorithms, decision tree algorithms, Bayesian algorithms, clustering algorithms, association rule learning algorithms, artificial neural network algorithms, deep learning algorithms, dimensionality reduction algorithms, ensemble algorithms, computer vision algorithms, natural language processing algorithms, and graphical model algorithms. This list is not exhaustive and different algorithms may be used for different tasks based upon the desired uses of machine learning. For example, regression algorithms are frequently used for predicting sales including the impact of new marketing campaigns. Decision tree algorithms are frequently used in interactive voice response (IVR) systems, which allow users such as customers or potential customers to interact with a host system of an organization using speech recognition or Dual Tone-Multi Frequency (DTMF) implemented by a keypad in order to make inquiries such as making inquiries regarding a product or service offered by the organization. However, one or more embodiments are not limited to these examples because other machine learning models are contemplated.

FIG. 2 also shows the mobile communication device 100 of FIG. 1 in greater detail. The mobile computing device 100 includes a processor 240 and a memory 250. The memory 250 stores a system application 252 which includes an operating system. The memory 250 also stores at least one application 254. An example of an application 254 may be a machine learning application such as a machine learning application, which could be utilized by a financial institution, and which may include or have access to a local machine learning system, which may include a local machine learning model. The user 110 may activate the machine learning application 254 using an icon displayed on the mobile computing device 100. However, machine learning application 254 is only one example of an application which can be stored in the memory 250 and which could be used in communication with machine learning systems in the cloud computing system 210 through network 200. The memory 250 may also store other applications such as a global positioning application which may provide the location of the mobile computing device 100. The mobile computing device 100 in FIG. 2 also includes a speaker 255 to output audio communication and a microphone 260 to receive audio communication so that a user 110 can communicate with a local machine learning system and/or the cloud computing system 210. The mobile computing device 100 includes a display 265, which can display a user interface and can be used to communicate with applications such as machine learning application 254 or the cloud computing system 210 through network 200. The mobile communication device 100 also includes communication components 270 to communicate with the cloud computing system 210.

Figure 3:
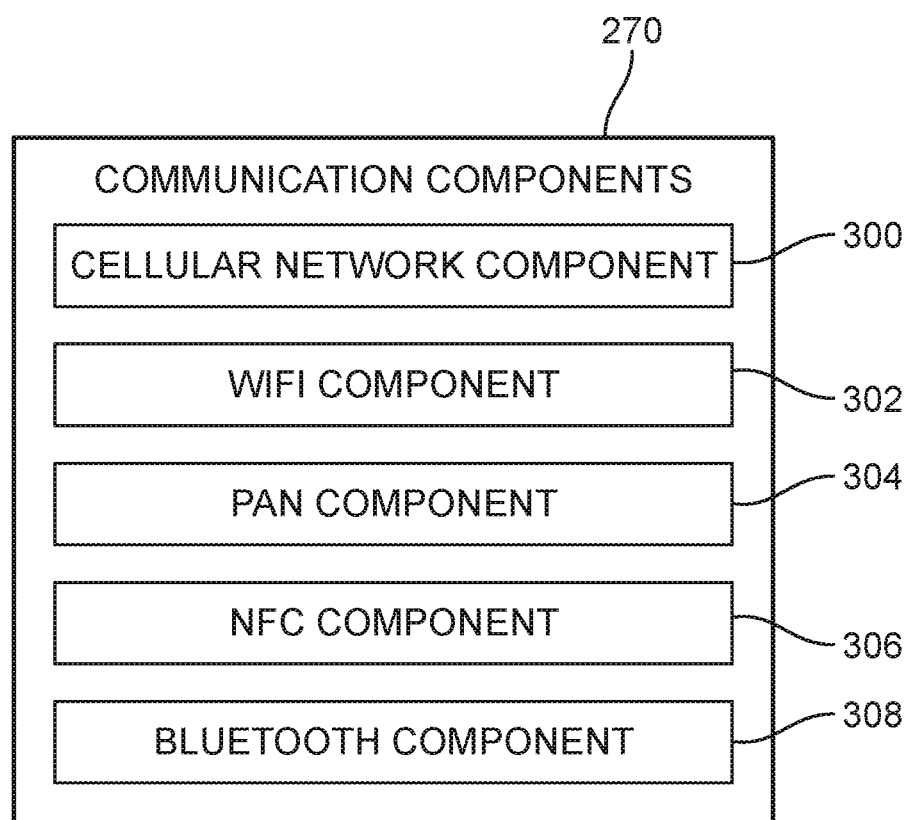
FIG. 3 is a schematic view of communications components of the mobile computing device of FIG. 2 according to an embodiment.

FIG. 3 is a schematic view of an example of communication components of the mobile computing device shown in FIGS. 1 and 2 in an embodiment. The communications components may include a cellular network component 300, a WIFI component 302, a personal area network (PAN) component 304, a near field communication (NFC) component 306, and a Bluetooth component 308. Any type of wireless or wired communication technology may be used to couple the mobile computing device 100 to the network 200 so that the mobile computing device 100 can communicate with the cloud computing system 210. One or more of these communication components 270 may be used to couple the mobile computing device 100 to the network 200.

Figure 4:
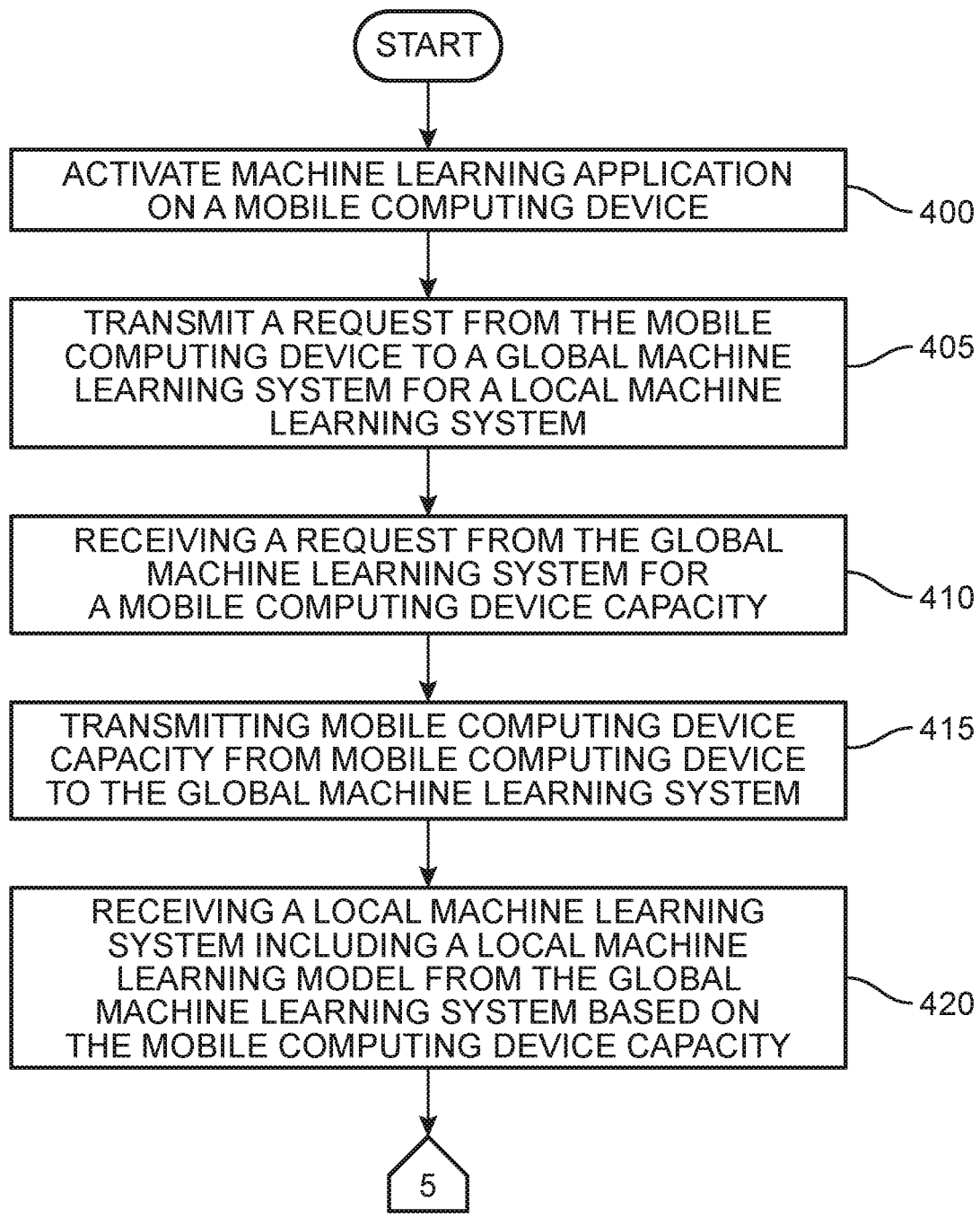
FIGS. 4 and 5 are flowcharts illustrating a process for providing a local machine learning system according to an embodiment.
Figure 5:
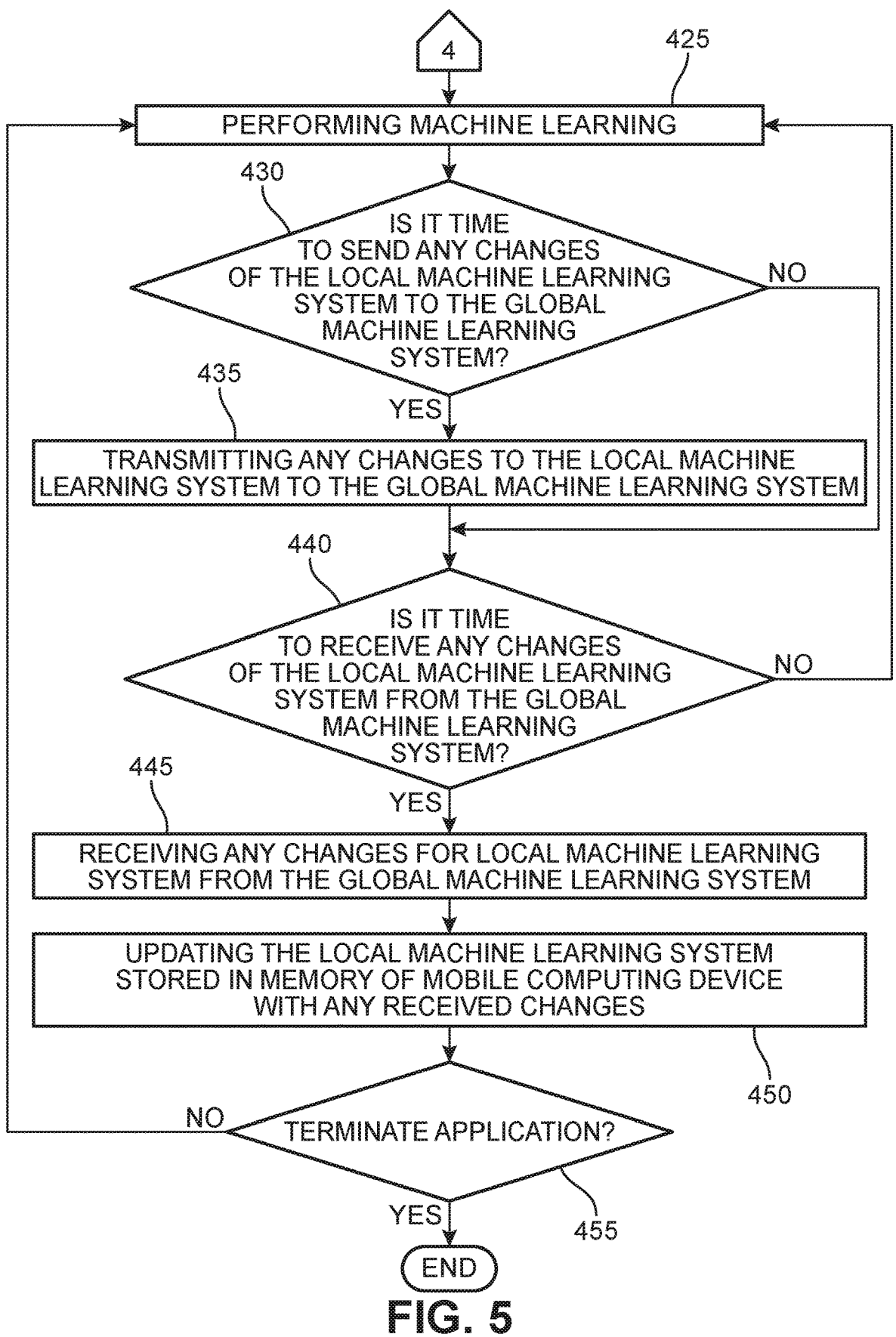
Figure 11:
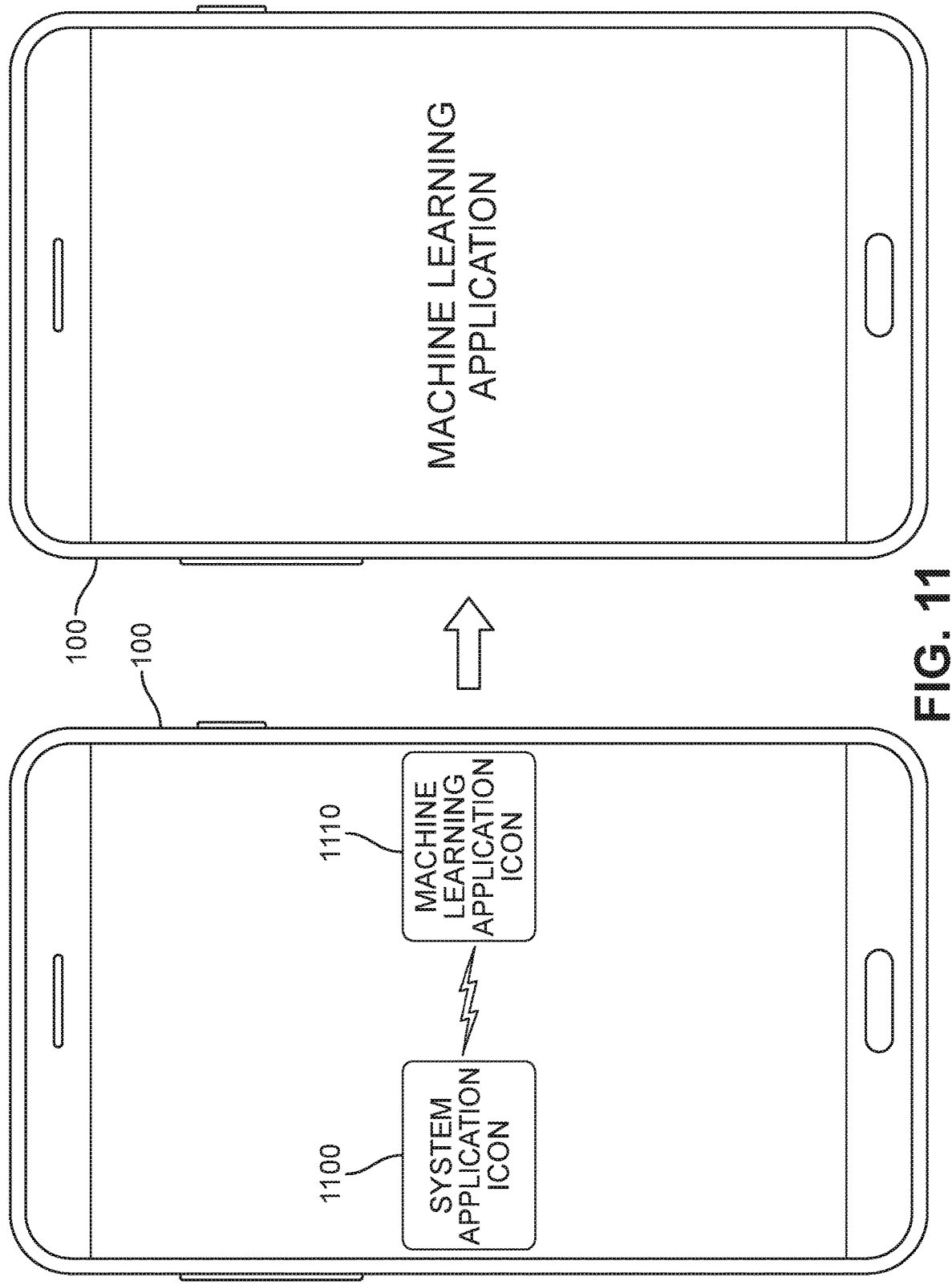
FIG. 11 is a schematic view of a mobile computing device of FIGS. 1 and 2 which shows an icon for a system application in communication with a machine learning application, which upon activation, establishes communication between a cloud computing system and the mobile computing device of FIGS. 1 and 2 according to an embodiment.

FIGS. 4 and 5 are flowcharts illustrating a process for providing a local machine learning system according to an embodiment. A user 110 may activate a machine learning application on a mobile computing device 100 (operation 400). For example, FIG. 11 is a schematic view of a mobile computing device 100 of FIGS. 1 and 2 which shows an icon for a system application 1100 in communication with a machine learning application (denoted by icon 1110), which upon activation, establishes communication between a cloud computing system 210 and the mobile computing device 100 of FIGS. 1 and 2 according to an embodiment. The mobile computing device 100 may transmit a request using one or more communication components 270 to the global machine learning system stored in the memory 220 of the cloud computing system 210 through network 200 (operation 405). The mobile computing device 100 may receive a request from the global machine learning system to provide the capacity of the mobile computing device 100 (operation 410). For example, the capacity may include the available memory in memory 250, which can be used to store a local machine learning system. The capacity may also include additional information regarding the configuration of the mobile computing device 100 and other applications such as the system application 252.

The mobile computing device 100 may transmit a mobile computing device capacity from the mobile computing device 100 to the global machine learning system stored in the memory 220 of the cloud computing system 210 through network 210 by using one or more of the communication components 270 of the mobile computing device 100 (operation 415). Based on the mobile computing device capacity, the mobile computing device 100 may receive from the cloud computing system 210 a local machine learning system including a local machine learning model at the direction of the global machine learning system (operation 420). The local machine model includes training parameters such as labels and weights. The local machine learning system may include one or more than one local machine learning model. As discussed above, the global machine learning system may include a plurality of local machine learning systems stored in the cloud computing system 210. The global machine learning system may also include at least one global machine learning model.

In this example, the machine learning application activated by the user and the local machine learning system may be a machine learning system for a body of an automobile or for a kitchen in a home. In this example, a financial institution may wish to use a machine learning system to evaluate the condition of an automobile at the time of purchase of an insurance policy or after an accident. However, these are merely examples of local machine learning systems, which include one or more local machine learning models.

Figure 12:
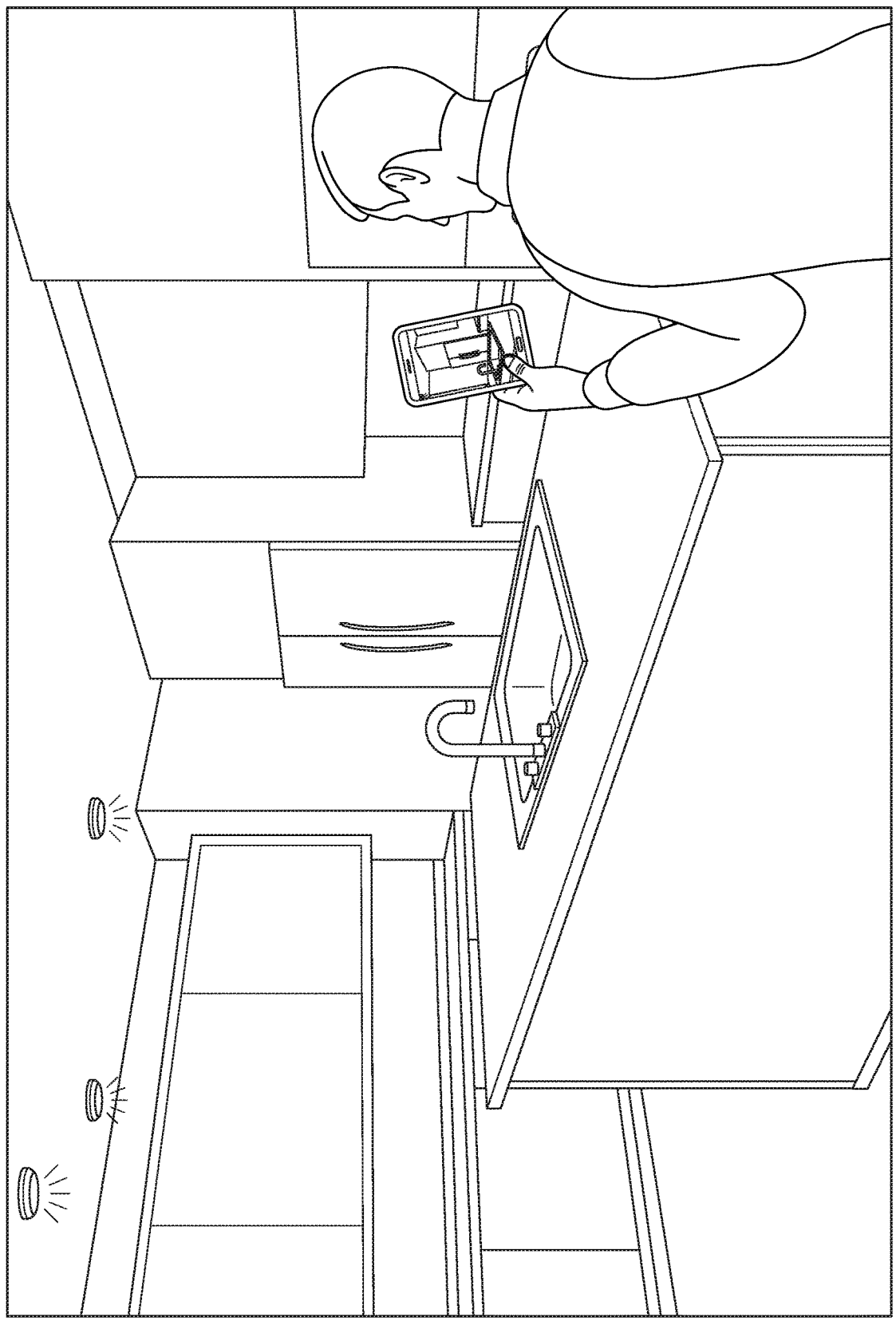
FIG. 12 is a schematic view of a user capturing images using the mobile computing device of FIGS. 1 and 2 according to an embodiment.
Figure 13:
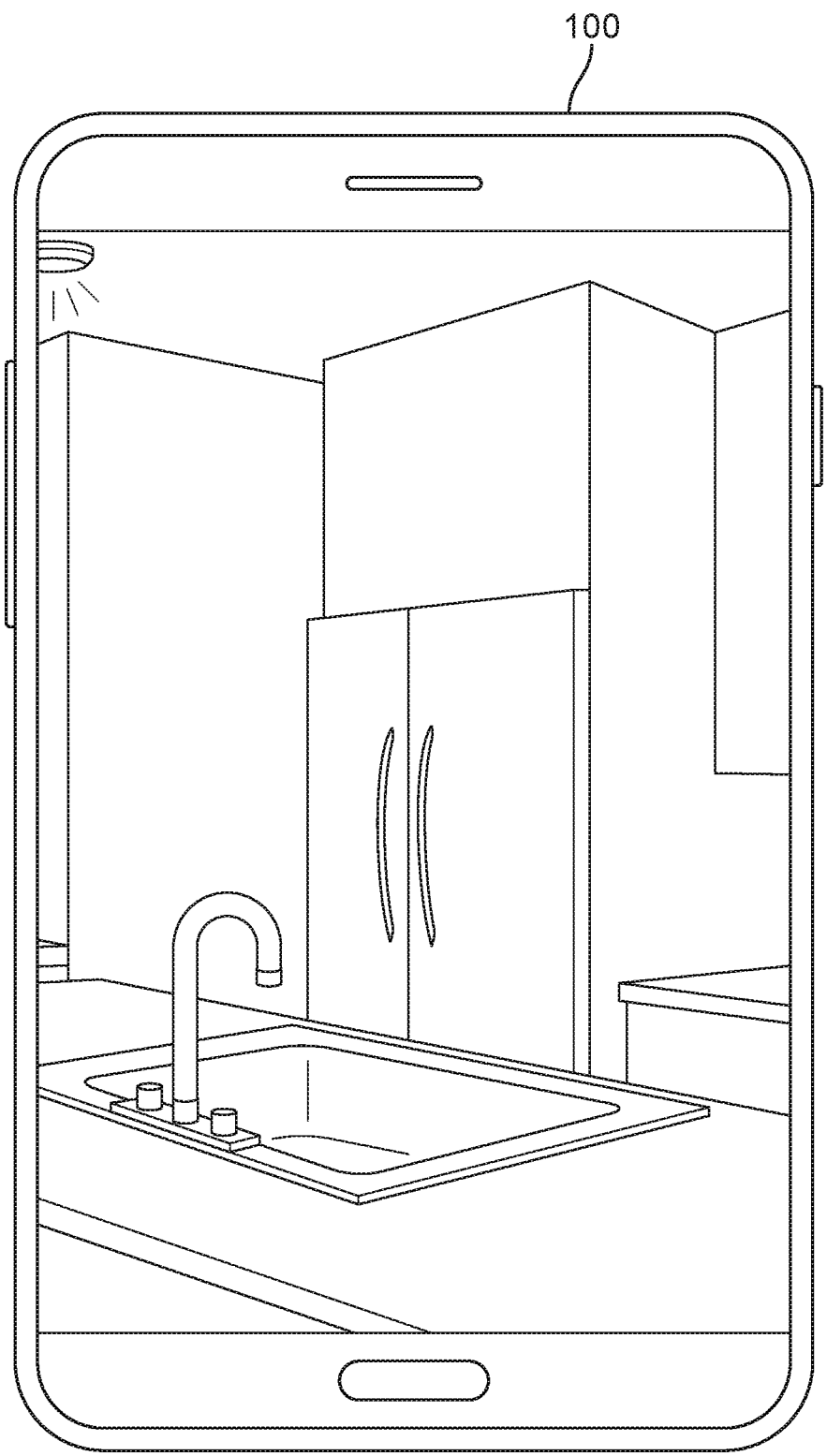
FIG. 13 is a schematic view of the image captured by the mobile computing device of FIG. 12, which is displayed on the mobile computing device, according to an embodiment.

Referring to FIG. 5, the local machine learning system stored in memory 250 of the mobile computing device 100 may perform machine learning (operation 425). For example, the local machine learning system which includes at least one local learning model is being trained by the user of the mobile computing device 100. Through this training, there may be changes to a local machine learning model (which are changes to a local machine learning system) due to changes in one or more parameters such as training parameters. As discussed above, examples of training parameters include labels and weights. For example, a local machine learning system may be used to detect objects, identify objects, track objects, and localize (highlight) an object for identification. In an example shown in FIG. 12, a user 110 may use a mobile computing device 100 to record images such as a screen shot, grab a portion of a live video, or record a live video of objects in a kitchen to identify objects in a kitchen. A recorded image may be shown in FIG. 13. Depending on the strength of the local machine learning system, the local machine learning system may prompt the user to confirm that one or more recorded images includes a countertop. If the user 120 confirms that the local learning system has correctly identified the countertop through mobile computing device 100, then the local learning system learns or is further trained from this experience due to the receipt of additional training data. In addition, suppose the local machine learning system prompts the user 120 to confirm that the countertop is made of granite. If the countertop is not granite, the user 100 uses the mobile computing device 100 to inform the local machine learning system that the countertop is not granite and may indicate the proper composition of the countertop. The local machine learning system learns (is trained) from this experience (training data) to improve the one or more local machine learning models. The local machine learning system could be further trained by even better models for detecting color, model and manufacturer of the countertop. A financial institution such as an insurance company may wish to have this information in order to provide estimates for an insurance or provide money to an insured who properly presents a claim due to a fire. This is an example of performing machine learning including training (operation 425).

Figure 14:
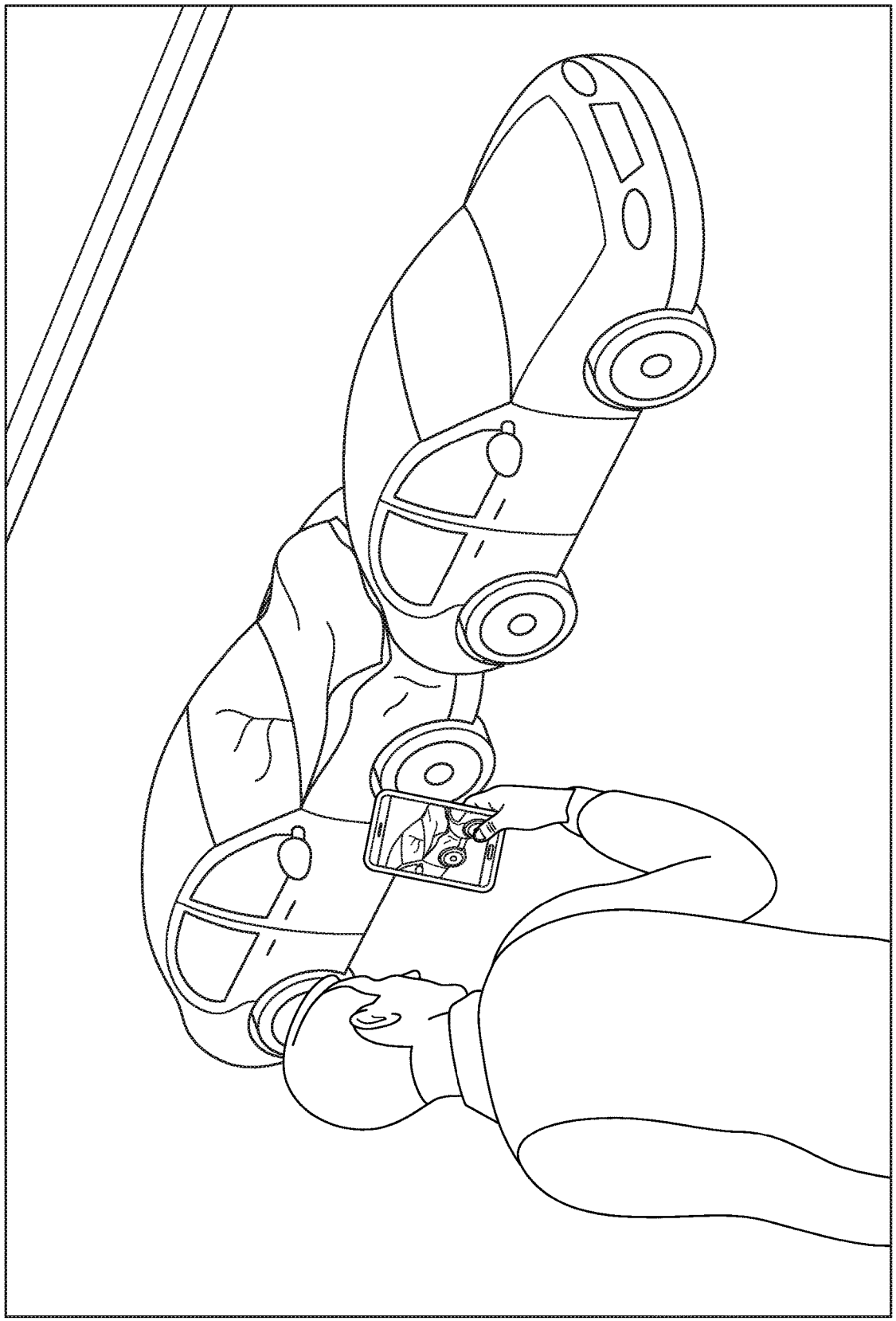
FIG. 14 is a schematic view of a user capturing images using the mobile computing device of FIGS. 1 and 2 according to an embodiment.
Figure 15:
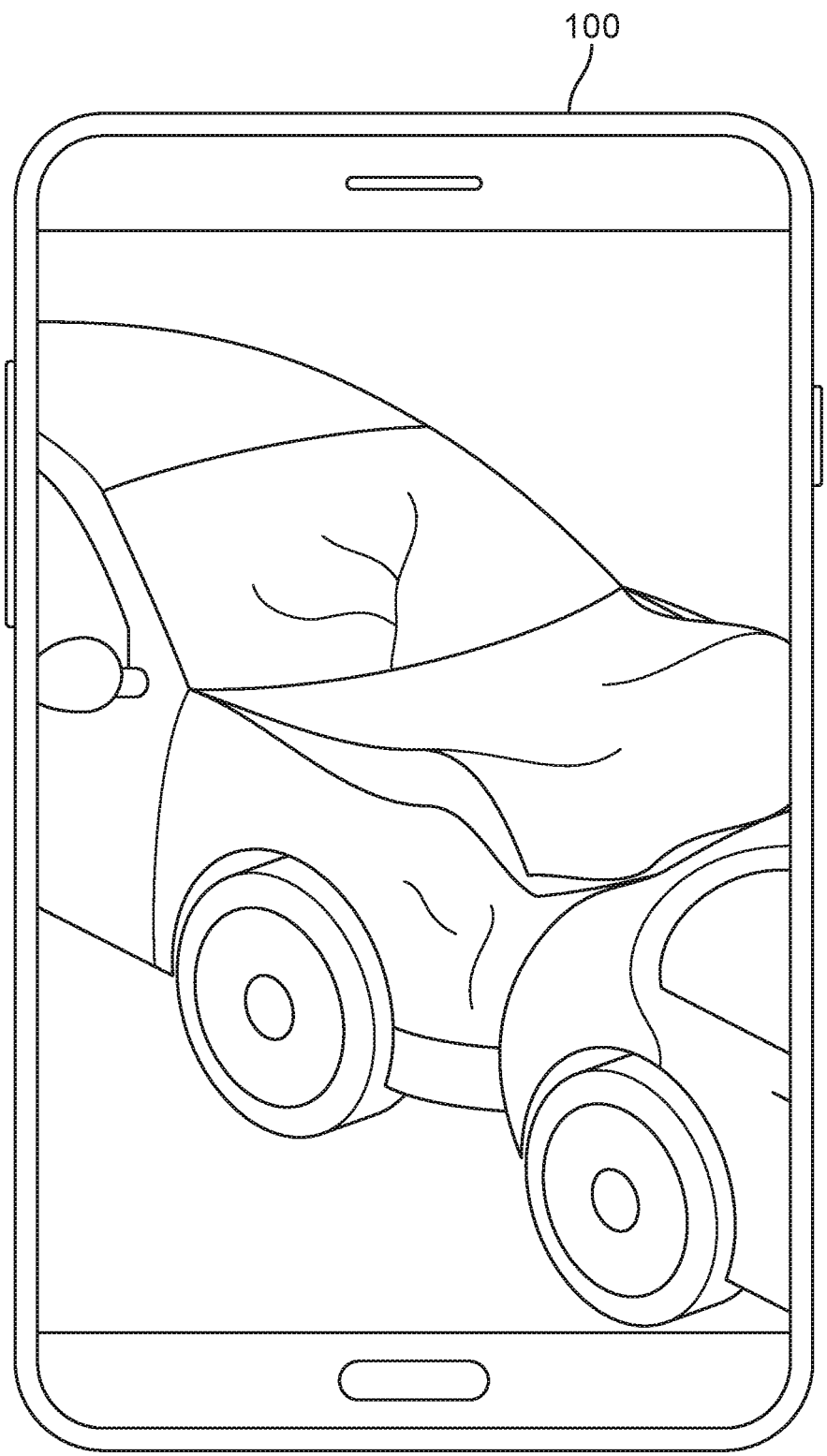
FIG. 15 is a schematic view of the image captured by the mobile computing device of FIG. 14, which is displayed on the mobile computing device, according to an embodiment.

In another example, FIG. 14 is a schematic view of a user capturing images using the mobile computing device 100 of FIGS. 1 and 2 according to an embodiment. In this example, a user 120 holds a mobile computing device 120 to record images such as a screen shot, grab a portion of a live video, or record a live video of objects including two automobiles after an accident. A recorded image may be shown in FIG. 15. Depending on the strength of the local machine learning system, the local machine learning system may prompt the user to confirm that one or more recorded images includes an automobile with a broken windshield, which needs to be replaced. If the user 120 confirms that the local machine learning system has correctly identified the windshield through the mobile computing device 100, then the local machine learning system learns or is further trained from this experience due to the receipt of this additional training data. In addition, suppose the local machine learning system prompts the user 120 to confirm that the windshield is from a make and model based on a review of the body of the automobile having the broken windshield. If the automobile is from a different make and model, the user 100 uses the mobile computing device 100 to inform the local machine learning system that the local machine learning system did not properly identify the make and/or model of the automobile. The user 120 of the mobile computing device 100 informs the local machine learning system of the correct make and/or model so that the local machine learning system is trained. This same process may be used to identify the damage hood and fenders. Through this training, there may be changes to a local machine learning model (which are changes to a local machine learning system) due to changes in one or more parameters such as training parameters (e.g. labels and/or weights). This is another example of machine learning including training (operation 425).

By performing the machine learning at an edge computing device, which is the mobile computing device 100 in these examples, this reduces the traffic between a mobile computing device 100 and a cloud computing system 210 (decreases latency) and takes advantage of the processing resources of the mobile computing device 100 to reduce the load of the cloud computing system 210. As discussed below, the process or system may periodically check for any changes to the local machine learning system (e.g. changes in one or more training parameters in a local machine learning model) and forward any changes in order to reduce traffic (decrease latency), which greatly increases processing efficiency and reduces the amount of computing resources.

Referring to FIG. 5, an embodiment may determine whether it is time to send any changes in the local machine learning system stored in the mobile computing device 100 to the global machine learning system stored in the memory 200 of the cloud computing system 210 (operation 430). Any changes in the local machine learning system such as changes in training parameters may be applied to the global machine learning system so that other users which have this same machine learning application on another mobile computing device can be updated at the appropriate time. The global machine learning system can also make changes to any local machine learning systems stored in the memory 200 of the cloud computing system 210 for future downloading. If the local learning system recognizes that it is time to send any changes to the local machine learning system from the mobile computing device 100 to the global machine learning system stored in the cloud computing system 210, the mobile computing device 100 using one or more of the communication components 270 transmits any changes to the local machine learning system to the global machine learning system in the cloud computing system 210 by network 200 (operations 430 and 435). By sending only the changes such as changes in one or more training parameters, this avoids sending the entire local machine learning system in order to reduce the use of processing resources and decrease latency. In addition, if there are no changes to the local machine learning system (operation 430), it is unnecessary to transmit anything from the local machine learning system to the global machine learning system.

Referring to operation 440, an embodiment may determine whether it is time to receive any changes to the local machine learning system from the global machine learning system in the memory 200 of the cloud computing system 210 (operation 440). If it is not time to receive any changes (operation 440), the process may return to operation 425 to continue to perform machine learning. If it is time to receive any changes of the local machine learning system from the global machine learning system (operation 440), the mobile computing device 100 receives changes for the local machine learning system from the global machine learning system from the cloud computing system 210 (operation 445). Any changes in the global machine learning system such as changes in training parameters, which may be applicable to the local machine learning system stored in the mobile computing device 100, may be received by the mobile computing device 100 (operation 445). As discussed above, the global machine learning system can also make changes to any local machine learning systems stored in the memory 200 of the cloud computing system 210 for future downloading. However, once the mobile computing device 100 has received a local machine learning system, only changes such as changes to one or more training parameters may be transmitted to the mobile computing device 100 to reduce the use of resources and decrease latency.

After the mobile computing device 100 receives any changes for the local machine learning system from the global machine learning system (operation 445), the local machine learning system stored in memory 250 of the mobile computing device 100 is updated with these changes (operation 450). If there are no changes, then it is unnecessary to update the local machine learning system. If the user 110 decides to terminate the machine learning application 254 (operation 455), then the process ends. If the user 110 does not terminate the machine learning application 254, then machine leaning is performed in operation 425 in the process. This machine learning process continues until the user 110 decides to terminate the application.

Figure 6:
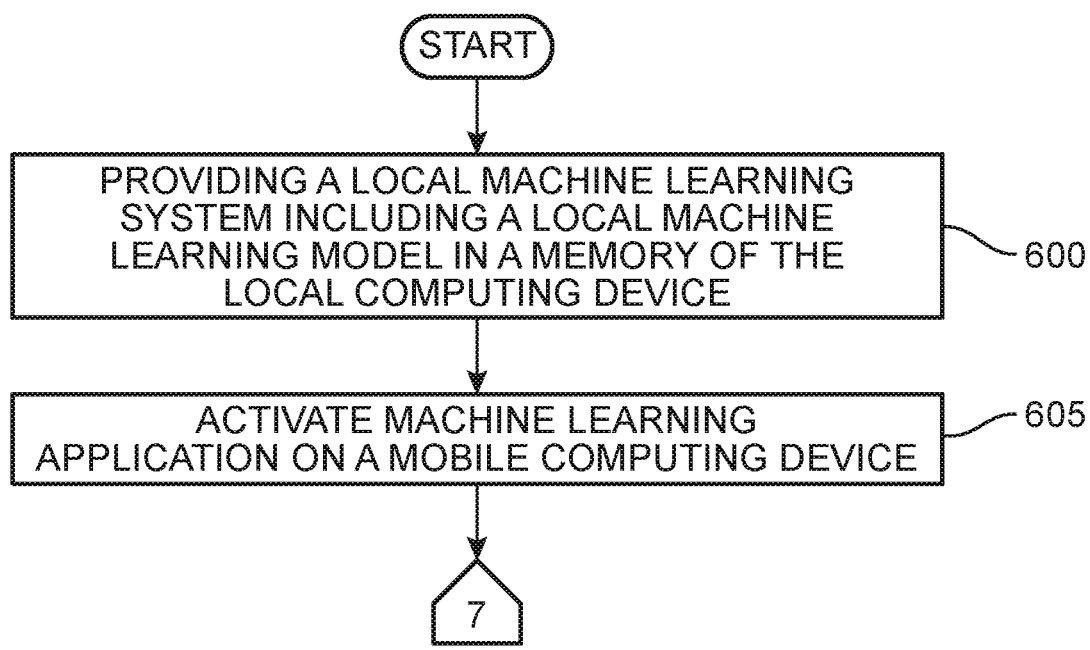
FIGS. 6 and 7 are flowcharts illustrating a process of updating machine learning systems according to an embodiment.
Figure 7:
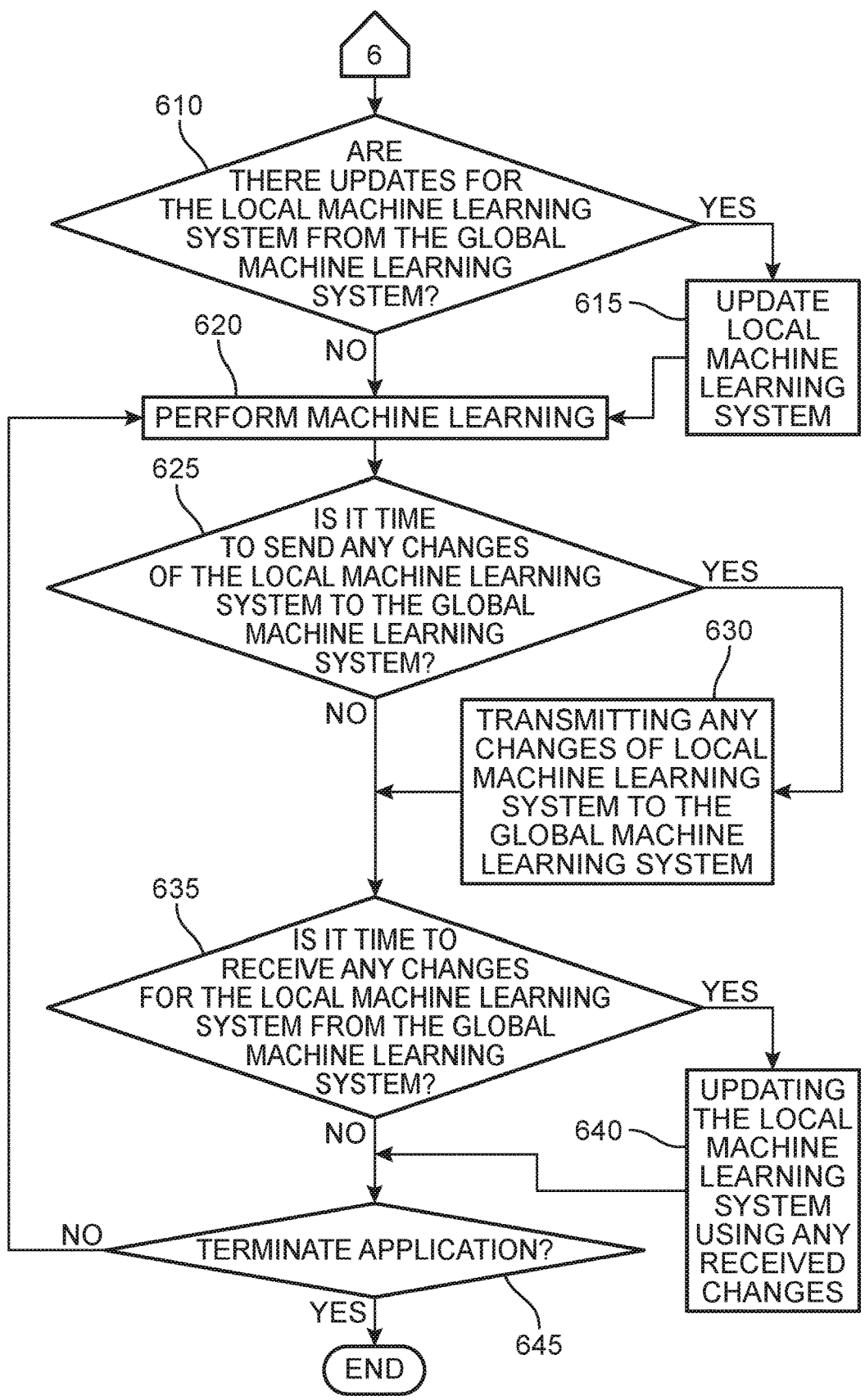

FIGS. 6 and 7 are flowcharts illustrating a process of updating machine learning systems according to an embodiment. In this example, a local machine learning system including a local machine learning model is stored in a memory 250 of a mobile computing device 100 (operation 600). Therefore, in this example, downloading of a machine learning system is unnecessary. A user 110 may activate a machine learning application 254 on the mobile computing device 100 (operation 605). For example, FIG. 11 is a schematic view of a mobile computing device 100 of FIGS. 1 and 2 which shows an icon for a system application 1100 in communication with a machine learning application (denoted by icon 1110), which upon activation, establishes communication between a cloud computing system 210 and the mobile computing device 100 of FIGS. 1 and 2 through a network 200 in FIG. 2 according to an embodiment.

Referring to FIG. 7, the process checks whether there are any updates for the local machine learning system from the global machine learning system, which is stored in the memory 220 of cloud computing system 210 (operation 610). If there are no updates, then the process moves to operation 620. If there are updates available for the local machine learning system, the local machine learning system stored in the memory 250 of the mobile computing device 100 are updated (operation 615). For example, updates may include any changes such as changes in one or more training parameters (e.g. labels and weights). These updates may be provided by the global machine learning system stored in the memory 220 of the cloud computing system 210.

Once the local machine learning system has been updated with any updates (operation 615), machine learning may be performed (operation 620). As discussed above with respect to operation 425 in FIG. 5, the local machine learning system which includes at least one local learning model is being trained by the user of the mobile computing device 100. Through this training, there may be changes to the local machine learning model (which are changes to a local machine learning system) due to changes in one or more training parameters such as labels and weights. For example, a local machine learning system may be used to detect objects, identify objects, track objects, and localize (highlight) an object for identification. Operation 620 may perform the same type of machine learning as operation 425 discussed above.

Referring to FIG. 7, an embodiment may determine whether it is time to send any changes in the local machine learning system stored in the mobile computing device 100 to the global machine learning system stored in the memory 200 of the cloud computing system 210 (operation 625). Any changes in the local machine learning system such as changes in one or more training parameters such as labels and weights may be applied to the global machine learning system so that other users which have this same machine learning application on another mobile computing device 100 can be updated at the appropriate time. The global machine learning system can also make changes to any local machine learning systems stored in the memory 200 of the cloud computing system 210 for future downloading. If the local machine learning system recognizes that it is time to send any changes to the local machine learning system from the mobile computing device 100 to the global machine learning system stored in the cloud computing system 210, the mobile computing device 100 using one or more of the communication components 270 transmits any changes to the local machine learning system to the global machine learning system in the cloud computing system 210 by network 200 (operations 625 and 630). By sending only the changes such as changes in one or more training parameters, this avoids sending the entire local machine learning system in order to reduce traffic (decrease latency) and reduce the load. In addition, if there are no changes to the local machine learning system (operation 625), it is unnecessary to transmit anything from the local machine learning system to the global machine learning system Referring to operation 635, an embodiment may determine whether it is time to receive any changes to the local machine learning system from the global machine learning system in the memory 200 of the cloud computing system 210 (operation 635). If it is time to receive any changes of the local machine learning system from the global machine learning system (operation 635), the mobile computing device 100 receives changes for the local machine learning system from the global machine learning system from the cloud computing system 210 and the local machine learning system is updated using any received changes (operation 640). Any changes in the global machine learning system such as changes in training parameters such as one or more of labels and weights, which may be applicable to the local machine learning system stored in the mobile computing device 100, may be received by the mobile computing device 100 and the local machine learning system may be updated (operation 640). As discussed above, the global learning system can also make changes to any local machine learning systems stored in the memory 200 of the cloud computing system 210 for future downloading. However, once the mobile computing device 100 has received a local machine learning system, only changes such as changes to one or more training parameters such as labels and weights may be transmitted to the mobile computing device 100 to reduce the use of resources (decrease latency).

As discussed above, after the mobile computing device 100 receives any changes for the local machine learning system from the global machine learning system, the local machine learning system stored in memory 250 of the mobile computing device 100 may be updated with these changes (operation 640). If there are no changes, then it is unnecessary to update the local machine learning system. If the user 110 decides to terminate the machine learning application 254 (operation 645), then the process ends. If the user 110 does not terminate the machine learning application 254, then machine leaning is performed in operation 620 in the process. This machine learning process continues until the user 110 decides to terminate the application.

Figure 8:
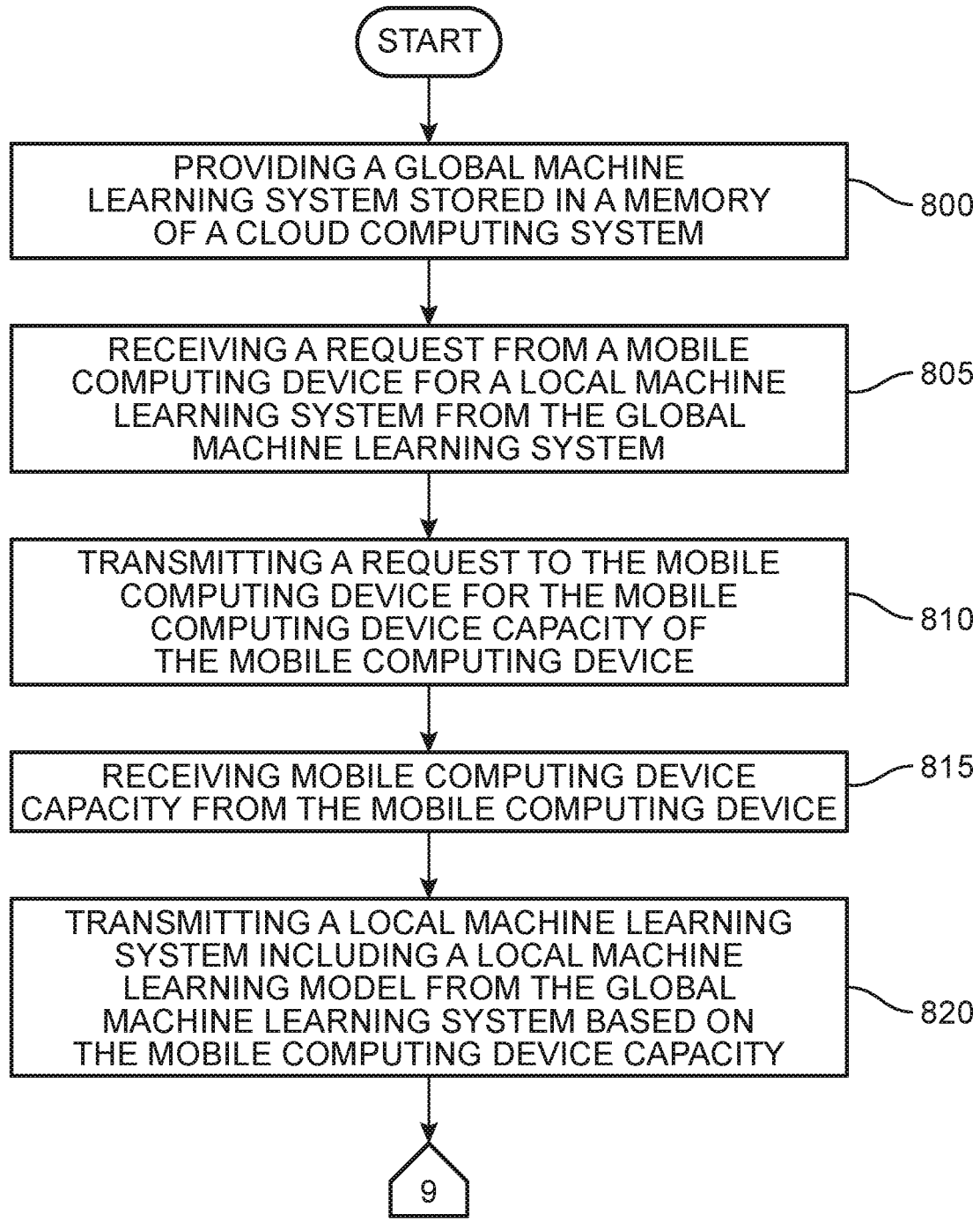
FIGS. 8 and 9 are flowcharts illustrating a process of updating machine learning systems according to an embodiment.
Figure 9:
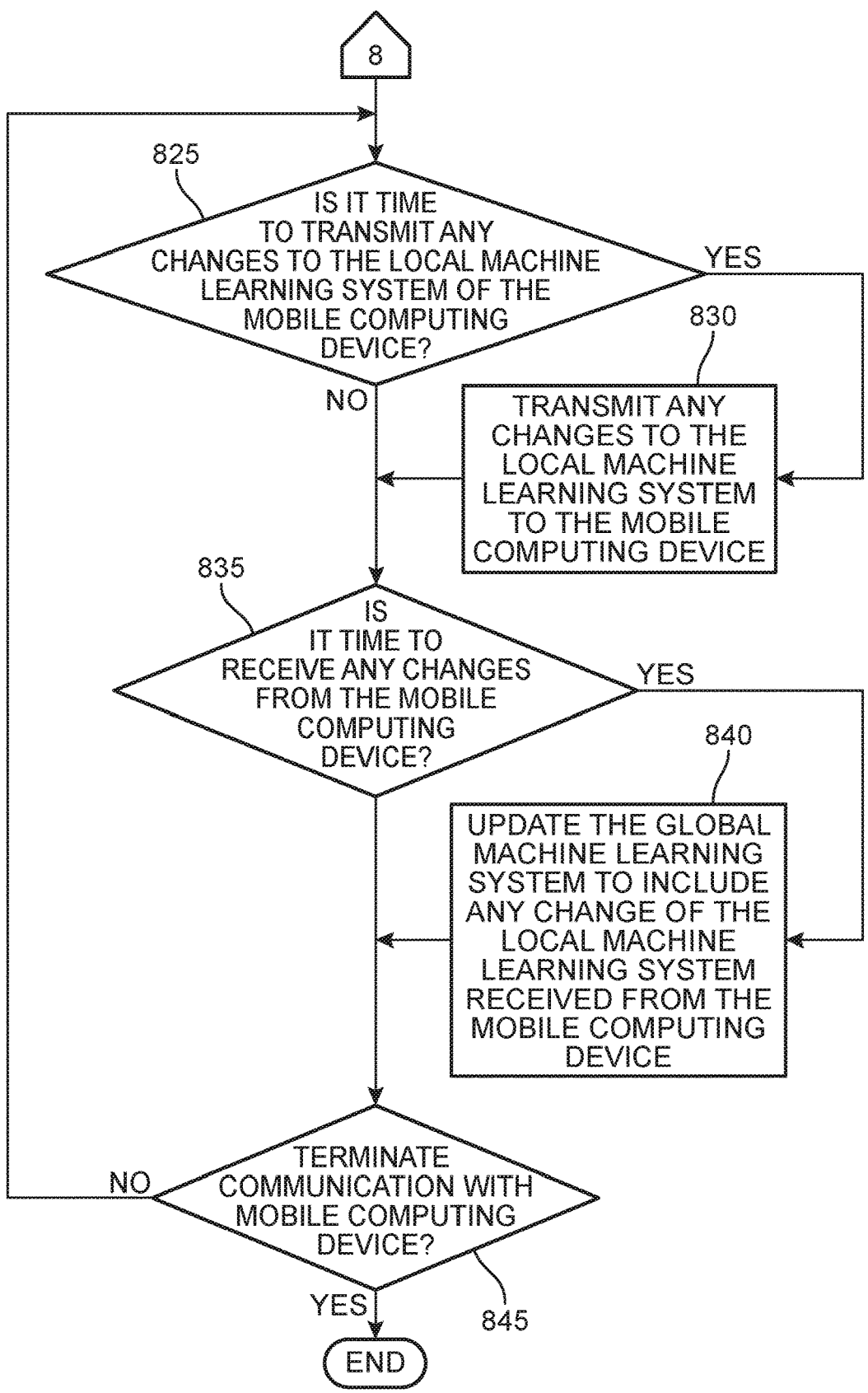

FIGS. 8 and 9 are flowcharts illustrating a process of updating machine learning systems according to an embodiment. In this example, one or more of the communication components 270 of mobile computing device 100 in FIG. 2 may be used to couple the mobile computing device 100 to the network 200, and the network 200 is coupled to the cloud computing system 210 as shown in FIG. 2. Referring to FIG. 8, a global machine learning system may be stored in a memory 220 of a cloud computing system 210 (operation 800). The global machine learning system may receive a request from a mobile computing device 100 through a network 200 for a local machine learning system from the global machine learning system (operation 805). The global machine learning system may transmit a request from the cloud computing system 210 to the mobile computing device 100 for the mobile computing device capacity of the mobile computing device 100 (operation 810). As discussed above, the capacity may include the available memory in memory 250, which can be used to store a local machine learning system in mobile computing device 100. The capacity may also include additional information regarding the configuration of the mobile computing device 100 and other applications such as the system application 252.

The global machine learning system may receive the mobile computing device capacity from the mobile computing device (operation 815), and the global machine learning system may direct the cloud computing system 210 to transmit a local machine learning system including a local machine learning model from the global machine learning system based on the mobile computing device capacity (operation 820). The local machine model includes training parameters such as labels and weights. The local machine learning system may include one local machine learning model or more than one local machine learning model. As discussed above, the global machine learning system may include a plurality of local machine learning systems stored in the cloud computing system 210. The global machine learning system may also include at least one global machine learning model.

Referring to FIG. 9, the global machine learning system may determine whether it is time to transmit any changes to the local machine learning system of the mobile computing device 100 (operation 825). If it is time to transmit any changes to the local machine learning system to the mobile computing device 100, these changes (if any) are transmitted (operation 830). If there are no changes, no changes are transmitted (operation 830). As discussed above, any changes such as changes in one or more training parameters such as labels and weights, which may be applicable to the local machine learning system stored in the mobile computing device 100, may be transmitted to the mobile computing device 100 (operation 830).

Referring to operation 835 of FIG. 9, the global machine learning system may determine whether it is time to receive any changes from the mobile computing device 100. If it is time, then the global machine learning system receives the changes from the mobile computing device 100 through the cloud computing system 210, and the global machine learning system updates the global machine learning system to include any changes of the local machine learning system received from the mobile computing device 100 (operation 840). If there are no changes, then it is unnecessary to update the global machine learning system (operation 840). If communication with the mobile communication device 100 is terminated by the user, then the process may be terminated (operation 845). However, if the user does not terminate the communication, then the process returns to operation 825 until the communication with the mobile computing device terminates (operation 845).

Figure 10:
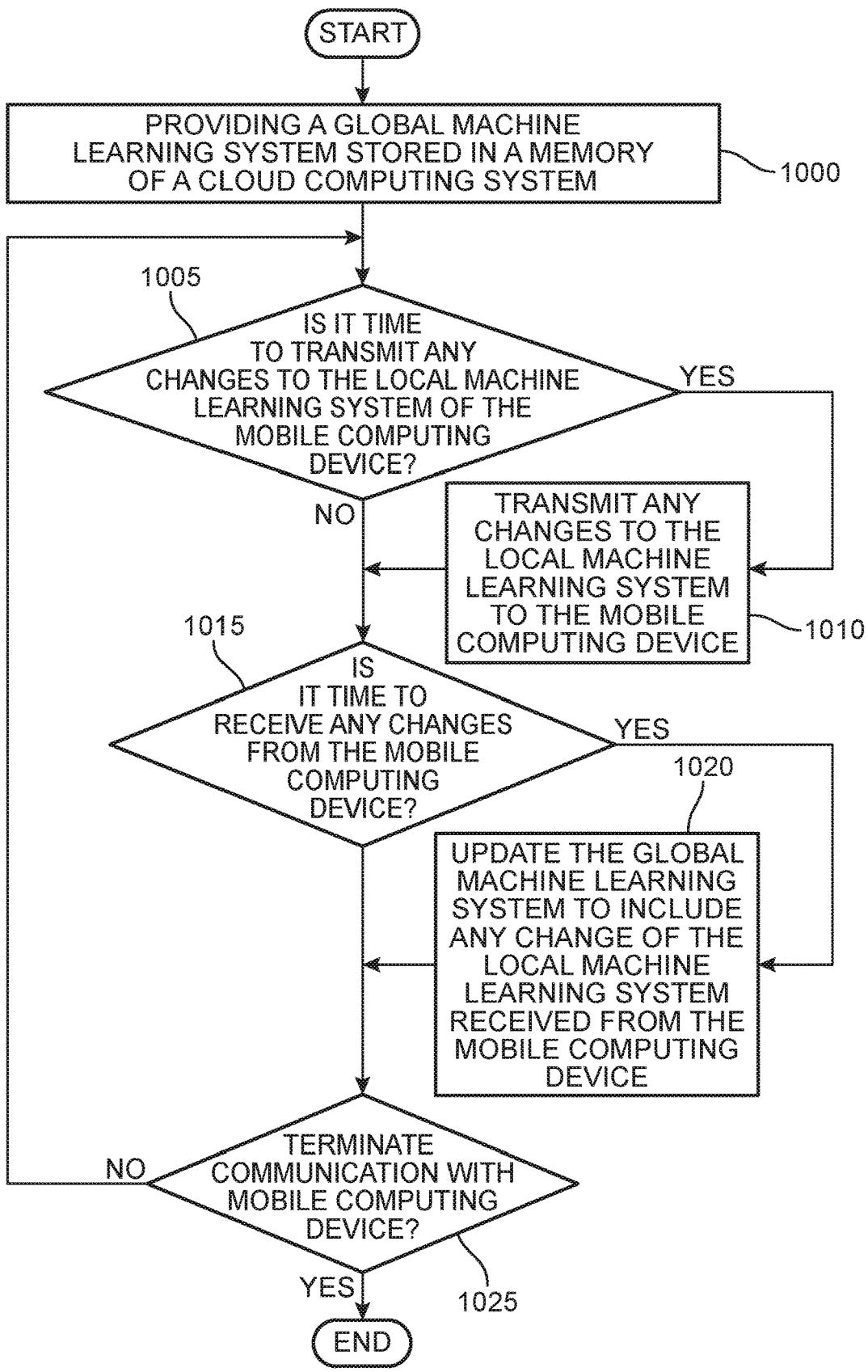
FIG. 10 is a flowchart illustrating a process of updating machine learning systems according to an embodiment.

FIG. 10 is a flowchart illustrating a process of updating machine learning systems according to an embodiment. In this example, one or more of the communication components 270 of mobile computing device 100 in FIG. 2 may be used to couple the mobile computing device 100 to the network 200, and the network 200 is coupled to the cloud computing system 210 as shown in FIG. 2. Referring to FIG. 10, a global machine learning system may be stored in a memory 220 of a cloud computing system 210 (operation 1000). The global machine learning system may determine whether it is time to transmit any changes to the local machine learning system of the mobile computing device 100 (operation 1005). If it is time to transmit any changes to the local machine learning system to the mobile computing device 100, these changes (if any) are transmitted (operation 1010). If there are no changes, no changes are transmitted (operation 1010). As discussed above, any changes such as changes in one or more training parameters such as labels and weights, which may be applicable to the local machine learning system stored in the mobile computing device 100, may be transmitted to the mobile computing device 100 (operation 1010).

Referring to operation 1015 of FIG. 10, the global machine learning system may determine whether it is time to receive any changes from the mobile computing device 100. If it is time, then the global machine learning system receives the changes from the mobile computing device 100 through the cloud computing system 210, and the global machine learning system updates the global machine learning system to include any changes of the local machine learning system received from the mobile computing device 100 (operation 1020). If there are no changes, then it is unnecessary to update the global machine learning system (operation 1020). As indicated above, by transmitting only the changes (such as changes in training parameters) in the local machine learning model, this reduces traffic (decreases latency), increases speed, and reduces the load of the cloud computing system 210 If communication with the mobile communication device 100 is terminated by the user, then the process may be terminated (operation 1025). However, if the user does not terminate the communication, then the process returns to operation 1005 until the communication with the mobile computing device terminates (operation 1025).

As discussed above, by performing the machine learning at an edge computing device, which is the mobile computing device 100 in these examples, this reduces the traffic between a mobile computing device 100 and a cloud computing system 210 (decreases latency) and takes advantage of the processing resources of the mobile computing device 100 to reduce the load of the cloud computing system 210. As discussed below, the process or system may periodically check for any changes to the local machine learning system or any changes to the global machine learning system and forward any changes in order to reduce traffic (reduce latency), which greatly increases processing efficiency and reduces the amount of computing resources It may be appreciated that the above systems and methods may apply not only to applications associated with financial institutions in the field of insurance but to any other fields pertaining to the use of machine learning using edge computing. The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for performing machine learning in mobile computing devices which are configured to be coupled with a cloud computing system, the method comprising:
   receiving at each one of the mobile computing devices a local machine learning system from a plurality of local machine learning systems in a global machine learning system hosted by the cloud computing system, the plurality of local machine learning systems based on different machine learning models and each local machine learning system is received by a different mobile computing device;
   activating, on each mobile computing device, a machine learning application, which accesses the local machine learning system including a local machine learning model, which includes one or more training parameters, and which is stored in a memory of each mobile computing device;
   periodically updating each local machine learning system based upon updates for the local machine learning system received from the global machine learning system hosted by the cloud computing system;
   performing machine learning on the local machine learning system at each mobile computing device at the same time, using training data received at each mobile computing device; and
   periodically transmitting changes to the local machine learning system resulting from the machine learning performed at each mobile computing device from each mobile computing device to the global machine learning system hosted by the cloud computing system to update the local machine learning system in the plurality of local machine learning systems in the global machine learning system;
   wherein the local machine learning system at one of the mobile computing devices is received from a different version of the global machine learning system, and each local learning model is stored and updated at a given mobile computing device and the cloud computing system.

2. The method of claim 1, wherein the method further comprises:
   activating, on each mobile computing device, the machine learning application which is configured to transmit a request from each mobile computing device to initiate communication with the global machine learning system hosted by the cloud computing system, to transmit a capacity including amount of available memory of each mobile computing device, a configuration of the mobile computing devices, and an identification of other applications on the mobile computing device, and to request the local machine learning system; and receiving the local machine learning system, which is based upon the capacity of each mobile computing device, and which is accessed by the machine learning application.

3. The method of claim 2, wherein periodically transmitting changes comprises transmitting only changes in the local machine learning system to the global machine learning system.

4. The method of claim 1, wherein the one or more training parameters include one or more weights and/or include one or more labels.

5. The method of claim 1, wherein the training data for the local machine learning include a live video feed, screen grabs of the live video feed, or input from a user of each mobile computing device.

6. The method of claim 1, wherein periodically updating the local machine learning system includes updating one or more training parameters of the local machine learning model, and the method further comprises using the local machine learning system to detect objects, to identify objects, to track objects, and to highlight an object for identification using the updated training parameters.

7. The method of claim 1, wherein periodically transmitting changes to the local machine learning system to the global machine learning system includes transmitting changes to one or more training parameters.

8. A method for performing machine learning to assist a user comprising:
    providing a global machine learning system comprising a plurality of local machine learning systems stored in a memory of a cloud computing system, the plurality of local machine learning systems based on different machine learning models and each local machine learning system is received by a different mobile computing device;
    receiving at mobile computing devices a local machine learning system from the plurality of local machine learning systems in the global machine learning system;
    activating, on each mobile computing device, a machine learning application, which accesses the local machine learning system including a local machine learning model, which includes one or more training parameters, and which is stored in a memory of each mobile computing device;
    periodically transmitting any changes to the local machine learning system from the global machine learning system stored in the cloud computing system to each mobile computing device;
    updating the local machine learning system at each mobile computing device based upon the transmitted changes from the global machine learning system;
    performing machine learning on the local machine learning system at each mobile computing device at the same time, using training data received at each mobile computing device;
    periodically transmitting changes to the local machine learning system resulting from the machine learning performed at each mobile computing device from each mobile computing device to the cloud computing system; and
    updating the global machine learning system with the transmitted changes from each mobile computing device;
    wherein the local machine learning system at one of the mobile computing devices is received from a different version of the global machine learning system, and each local learning model is stored and updated at a given mobile computing device and the cloud computing system.

9. The method of claim 8, wherein the global machine learning system stores one or more selectable local machine learning systems for selection and retrieval by the machine learning application of each mobile computing device at a request of a user of each mobile computing device and the global machine learning system comprises software modules to facilitate the learning process, to answer questions, to make determinations, to make recommendations, to execute recommendations, to make predictions, and to execute predictions.

10. The method of claim 8, wherein the one or more training parameters include one or more weights.

11. The method of claim 8, wherein the one or more training parameters include one or more labels.

12. The method of claim 8, wherein the training data for the local machine learning include a live video feed, screen grabs of the live video feed, or input from a user of each mobile computing device.

13. The method of claim 8, wherein each mobile computing device comprises one of a smartphone, a tablet, a smartwatch, a smart glass, a smart helmet, and a laptop.

14. The method of claim 8, wherein periodically updating the local machine learning system includes updating one or more training parameters of the local machine learning model, and once each mobile computing device has received the local machine learning system, only changes to the local machine learning system and not the entire local machine learning systems are transmitted to each mobile computing device.

15. The method of claim 8, wherein periodically transmitting changes to the local machine learning system from each mobile computing device to the cloud computing system includes transmitting changes to one or more training parameters.

16. A cloud computing system to perform machine learning using mobile computing devices comprising at least one memory comprising instructions and at least one hardware processor to execute the instructions within the at least one memory to implement:
    storing a global machine learning system comprising a plurality of local machine learning systems, which each include one or more training parameters, in a memory of the cloud computing system, the plurality of local machine learning systems based on different machine learning models and each local machine learning system is received by a different mobile computing device;
    transmitting a local machine learning system selected from the plurality of local machine learning systems stored in the global machine learning system;
    periodically transmitting to each mobile computing device changes to the local machine learning system stored on each mobile computing device;
    updating the local machine learning system on each mobile computing device based the transmitted changes to the local machine learning system; and
    performing machine learning on the local machine learning system at each mobile computing device at the same time, using training data received at each mobile computing device; and
    periodically transmitting changes to the local machine learning system resulting from the machine learning performed at each mobile computing device from each mobile computing device to the global machine learning system hosted by the cloud computing system to update the local machine learning system in the plurality of local machine learning systems in the global machine learning system;

wherein the local machine learning system at one of the mobile computing devices is received from a different version of the global machine learning system, and each local learning model is stored and updated at a given mobile computing device and the cloud computing system.

17. The cloud computing system of claim 16, wherein periodically receiving changes to the local machine learning system from the local machine learning system of each mobile computing device includes receiving changes to one or more training parameters.

18. The method of claim 1, wherein each local learning model is stored and updated at a given mobile computing device and the cloud computing system is unique to the given mobile computing device, and processing resources of the mobile computing device are used to receive training data to facilitate the learning process, to answer questions, to make determinations, to make recommendations, to execute recommendations, to make predictions, and to execute predictions.

19. The method of claim 8, wherein each local learning model is stored and updated at a given mobile computing device and the cloud computing system is unique to the given mobile computing device, and processing resources of the mobile computing device are used to receive training data to facilitate the learning process, to answer questions, to make determinations, to make recommendations, to execute recommendations, to make predictions, and to execute predictions.

20. The method of claim 16, wherein each local learning model is stored and updated at a given mobile computing device and the cloud computing system is unique to the given mobile computing device, and processing resources of the mobile computing device are used to receive training data to facilitate the learning process, to answer questions, to make determinations, to make recommendations, to execute recommendations, to make predictions, and to execute predictions.

* * * * *